(12) United States Patent
Carney

(10) Patent No.: US 6,483,432 B1
(45) Date of Patent: Nov. 19, 2002

(54) INTRUSION ALARM AND DETECTION SYSTEM

(76) Inventor: William P. Carney, 4 High Ridge La., Oyster Bay, NY (US) 11771

( * ) Notice: Subject to any disclaimer, the term of this patent is extended or adjusted under 35 U.S.C. 154(b) by 11 days.

(21) Appl. No.: 09/624,513

(22) Filed: Jul. 24, 2000

Related U.S. Application Data

(63) Continuation-in-part of application No. 09/372,836, filed on Aug. 12, 1999.

(51) Int. Cl.$^7$ .............................................. G08B 13/00
(52) U.S. Cl. ..................... 340/541; 340/568.2; 340/506; 340/825.06; 340/825.32; 340/310.01
(58) Field of Search ................................ 340/541, 565, 340/566, 567, 568.2, 650, 875.06, 506, 825.32, 310.01

(56) References Cited

U.S. PATENT DOCUMENTS

| | | | | |
|---|---|---|---|---|
| 4,791,409 A | * | 12/1988 | Reid | 340/539 |
| 5,021,779 A | * | 6/1991 | Bisak | 340/538 |
| 5,034,723 A | * | 7/1991 | Maman | 340/568 |
| 5,059,948 A | * | 10/1991 | Desmeules | 340/568 |
| 5,231,375 A | * | 7/1993 | Sanders et al. | 340/568 |
| 5,530,431 A | * | 6/1996 | Wingard | 340/568 |

* cited by examiner

Primary Examiner—Daryl Pope
(74) Attorney, Agent, or Firm—Charles E. Temko

(57) ABSTRACT

A self-contained monitor including a volatile memory circuit having an armed and a disarmed state, a nonvolatile memory circuit, a responder and an intrusion detector is disposed in a predetermined space to sense and report an intrusion therein. A primary power source having momentary and sustained power interruptions associated therewith energizes the self-contained monitor. A short term energy storage circuit provides secondary power to the volatile memory circuit communicating therewith and with the primary power source so that momentary power interruptions do not result in the volatile memory circuit sensing a loss of power. The volatile memory circuit is switched from the armed to the disarmed state by either the sensing of the intrusion or by the sensing of at least one sustained power interruption. A user employs a remote controller to transmit an RF test signal to remotely test the state of the volatile memory circuit. A tuning code relating to the RF test signal is stored in the nonvolatile memory circuit which makes the monitor responsive to the RF test signal. A test response is generated by the responder prompted by the RF test signal when the volatile memory circuit is in the armed state.

17 Claims, 3 Drawing Sheets

INTRUSION ALARM AND DETECTION SYSTEM

CROSS REFERENCE TO RELATED APPLICATION

This application is a Continuation-in-part of U.S. patent application Ser. No. 09/372,836 filed Aug. 12, 1999.

BACKGROUND OF THE INVENTION

1. Field of the Invention

This invention relates generally to burglar alarm systems and more particularly to a self-contained monitor surveiling a predetermined space in a premises for an occurrence of an intrusion. The self-contained monitor includes a memory circuit which may be remotely tested by a returning occupant to determine if an intrusion has occurred in the predetermined space.

2. Description of Related Art

Burglar alarm systems comprising a self-contained intrusion monitor used to surveil a predetermined space and a remote controller employed to control the self-contained monitor are well known in the art. In such systems, the monitor typically includes a motion sensor and a memory circuit. The motion sensor detects an unauthorized entry into the predetermined space in a premises such as an apartment or a house and the memory circuit records the occurrence of the intrusion. Before reentering the premises, a returning occupant manipulates the remote controller to prompt a response from the self-contained monitor to determine if an intrusion has occurred and whether it is safe to enter the premises.

U.S. Pat. No. 5,621,385, issued to William P. Carney on Apr. 15, 1997, teaches an alarm system comprising a self-contained monitor and a hand held remote controller. The monitor, powered by either batteries or by an AC power line transformed and rectified to supply a DC potential, surveils a predetermined space, initiates an alarm as a result of an intrusion into the space and records the occurrence of the intrusion. Carney's system provides a reliable RF signalling protocol which enables an authorized user to remotely arm, disarm or test the monitor for the intrusion without causing a false test report through misuse of the remote controller. Should the monitor sense either an intrusion or a power interruption, it does not respond to an RF test signal thereby warning the occupant not to reenter the premises to avoid the possibility of encountering a remaining intruder. Carney's system reports all sensed power interruptions as having been caused by an intrusion. His disclosure does not teach a self-contained monitor that minimizes the number of intrusion reports caused by faults which frequently occur on an AC power line that are not a result of an intrusion. False intrusion reports are a significant problem and inconvenience for a returning occupant who needlessly seeks help based on the lack of a monitor response which was caused by a power line fault rather than by an actual intrusion.

U.S. Pat. No. 5,808,547 which issued to William P. Carney on Sep. 15, 1998 as a Continuation-in-Part (CIP) of the above referenced U.S. Pat. No. 5,621,385 teaches an alarm system comprising a battery powered hand held remote controller and a self-contained monitor energized by either batteries or an AC adaptor cord. The self-contained monitor includes an intrusion detector for sensing an intrusion and a memory circuit being switched from an armed state to a disarmed state by a sensing of either an intrusion or a power interruption to the monitor. The CIP teaches a remote controller which employs a unique RF signaling protocol to arm, disarm and test the monitor for an occurrence of either an intrusion or a power interruption. If the monitor senses either the intrusion or the power interruption it does not respond to an RF test signal. The CIP teaches that all sensed power interruptions are reported as having been caused by an intrusion. The lack of a response to the RF test signal warns a returning occupant that an intrusion may have occurred and there exists the possibility of confronting a remaining intruder should he or she enter the premises. Carney's signalling protocol enables the returning occupant to repeatedly test the monitor to be sure of its response before engaging in what may be a time consuming and stressful effort to seek help. Carney does not address the problem of false intrusion reports being produced by the monitor because AC power line faults occurring on the AC line supplying power to the monitor switched the memory to the disarmed state.

U.S. patent application Ser. No. 09/372,836, filed by William P. Carney on Aug. 12, 1999, teaches an intrusion alarm and detection system. The system defines a self-contained monitor for sensing and recording an intrusion and a remote controller employed by a user to arm, disarm and test the monitor by transmitting a coded RF signal thereto. The monitor includes a primary power source comprising either an AC power line or batteries, a nonvolatile memory circuit for secreting a binary code associated with the RF signal, a motion detector for sensing the intrusion and a volatile memory for recording the occurrence of either the intrusion or an interruption of power to the monitor. As taught by Carney, the volatile memory circuit is switched from an armed state to a disarmed state by either the sensing of an intrusion or by an interruption of the primary power. The code stored in the nonvolatile memory is not effected by either a momentary or a sustained power interruption. When the volatile memory circuit is in the armed state, the monitor produces a response to an RF test signal transmitted by the remote controller. If the monitor has sensed an intrusion or a power failure and the volatile memory circuit has been switched to the disarmed state, the monitor does not respond, thus warning the returning occupant not to reenter his or her premises. However, Carney does not teach a means by which to prevent momentary power interruptions that may occur on the AC power line from prompting the volatile memory to falsely record the same as a power interruption caused as a result of an intrusion.

U.S. patent application Ser. No. 09/547,053 filed by William P. Carney on Apr. 10, 2000 teaches a remotely accessed intrusion detection system. The system includes a self-contained monitor energized by a primary power source comprising a battery pack and/or a power jack for receiving an AC adaptor cord. In one aspect of the disclosure, Carney teaches a remote controller for arming, disarming and testing the monitor. The self-contained monitor transmits an RF monitor signal to an interface module communicating with a telephone answering machine recording the occurrence of the alarm condition thereon. A user calls the answering machine from a telephone at a distant location to receive a recorded report from the answering machine regarding the alarm condition. Carney does not address the problems associated with momentary power interruptions associated with the AC power line energizing the self-contained monitor and the possibility of such interruptions resulting in the reporting of erroneous alarm conditions by the self-contained monitor.

As can be seen from the foregoing, remotely controlled self-contained monitors offer a cost effective and reliable means by which to surveil a predetermined space and report the occurrence of an intrusion therein. Nevertheless, to optimize the reliability of the test reports produced by such self-contained monitors, there is a need in the industry to provide a self-contained monitor which does not mistakenly record momentary power line faults on an AC line energizing the monitor as power interruptions of the type which typically occur as a result of an intrusion.

SUMMARY OF THE INVENTION

The present invention is directed to a system that solves the problem of providing a cost effective and reliable means by which a user can employ a self-contained monitor powered by a primary power source to surveil a predetermined space and report the occurrence of an intrusion therein. The self-contained monitor may be remotely tested for the occurrence without concern that an erroneous intrusion report was generated as a result of a momentary power interruption associated with the primary power source.

The present invention is an improved intrusion detection system of the type a self-contained monitor surveiling a predetermined space for detecting an occurrence of an intrusion in the space. The intrusion detection system employs a primary power source energizing the self-contained monitor including a volatile memory circuit having an armed state and a disarmed state communicating with a nonvolatile memory circuit having a tuning code stored therein. The volatile memory circuit is switched from the disarmed state to the armed state by an arming signal which is qualified by the tuning code and is switched from the armed state to the disarmed state by a sensing of an interruption of primary power thereto. The improvement comprises the volatile memory circuit sensing only the interruption of primary power having a duration longer than a preset period of time and a short term energy storage circuit communicating with the primary power source and the volatile memory circuit supplying secondary power thereto such that the volatile memory circuit does not sense the interruption of primary power during the preset period of time.

DETAILED DESCRIPTION OF THE PREFERRED EMBODIMENTS

Before describing the details of the embodiment of the present invention, a discussion of a prior art remotely controlled self-contained intrusion alarm monitor is considered apposite.

Figure 1:
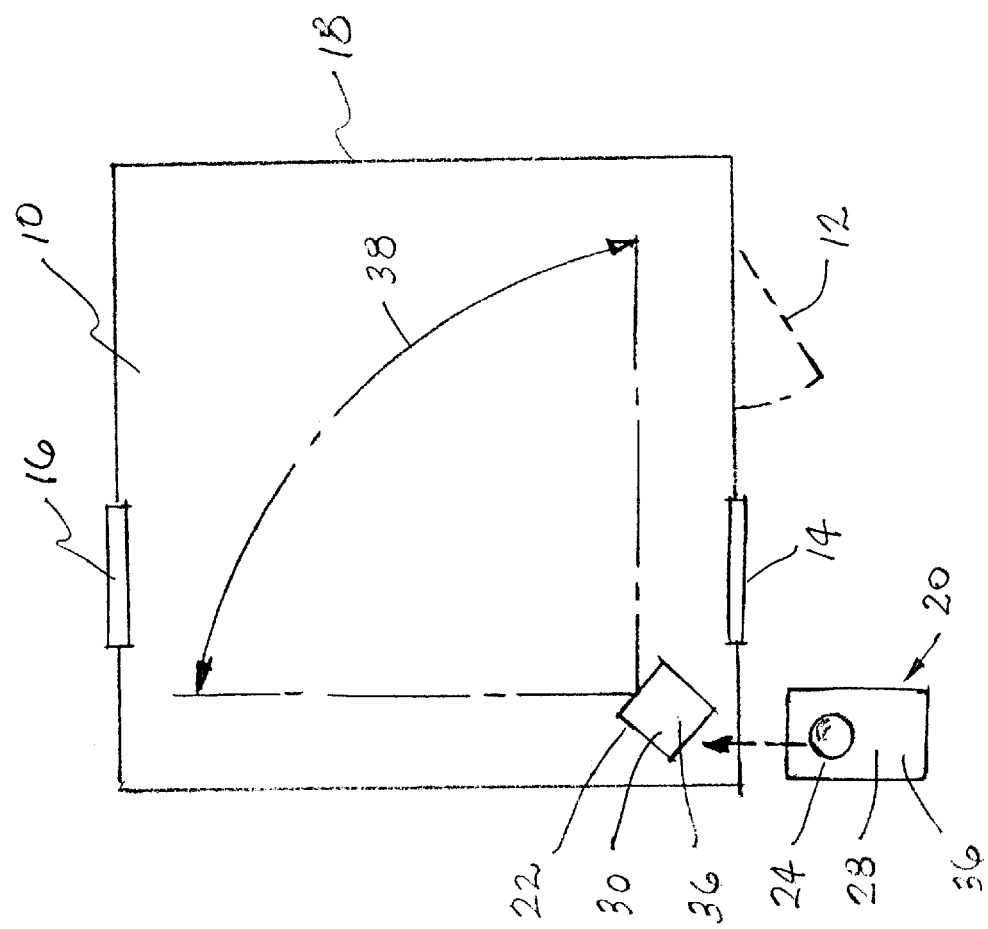
FIG. 1 is a plan view of a prior art self-contained intrusion monitor disposed to surveil a predetermined space. Also included in this figure is a prior art remote controller.

Turning now to the Figures, there is shown in FIG. 1, by way of explanation, a prior art intrusion detection system used to monitor a predetermined space 10 for an intruder. The space 10 includes a door 12 and may or may not include additional openings such as a front window 14 and a rear window 16 depending on a particular premises 18 in which the system is deployed. The system comprises an authorized remote controller generally referred to by reference number 20 and a Passive Infrared (PIR) intrusion monitor 22 having a detection pattern 38. The remote controller 20 may be hand held and includes a button switch 24 and a transmitter circuit 28 and remotely controls the intrusion monitor 22 by transmitting a Radio Frequency (RF) carrier signal to a receiver circuit 30. The intrusion monitor 22 is disposed within the predetermined space 10 and can be armed, disarmed, and tested by the carrier signal initiated by an authorized user manipulating the button switch 24. When armed, the intrusion monitor 22 produces an alarm response if the detection pattern 38 is entered by the intruder. In addition, the intrusion monitor 22 records and may be tested from outside of the premises 18 by the remote controller 20 for the intrusion so that a returning occupant is warned not to reenter the predetermined space 10, thus avoiding the risk of confronting the intruder. The transmitter circuit 28 and the receiver circuit 30 noted in FIG. 1 operate in a manner similar to the manner in which transmitter and receiver circuits operate in remotely controlled garage door systems having a typical button switch remote which causes a particular RF carrier signal to be transmitted to a receiver to either open or close a garage door. So that interference with other systems in the vicinity does not occur, garage door transmitters are generally tuned to associated receivers by any one of a number of well known methods such as by tuning one to the other in the factory, by matching the settings on a plurality of two position switches 36 in the transmitter 20 to the settings on a similar plurality of two position switches 36 in the self-contained monitor 22 or by the use of a known code learning technique wherein receivers are taught by authorized transmitters to be responsive thereto. The plurality of two position switches 36 is often referred to in the art as a Dual In-Line Package (DIP) switch.

Figure 3:
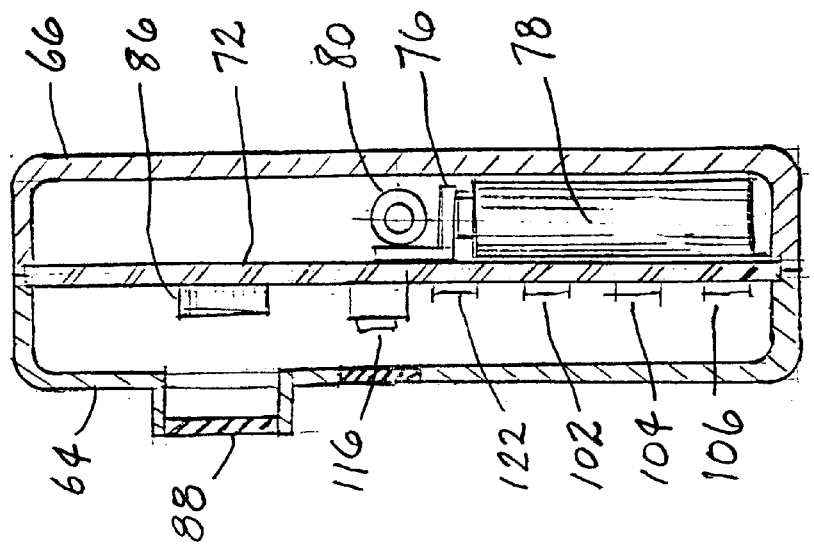
FIG. 3 is a sectional view taken along the line 3—3 in FIG. 2.
Figure 2:
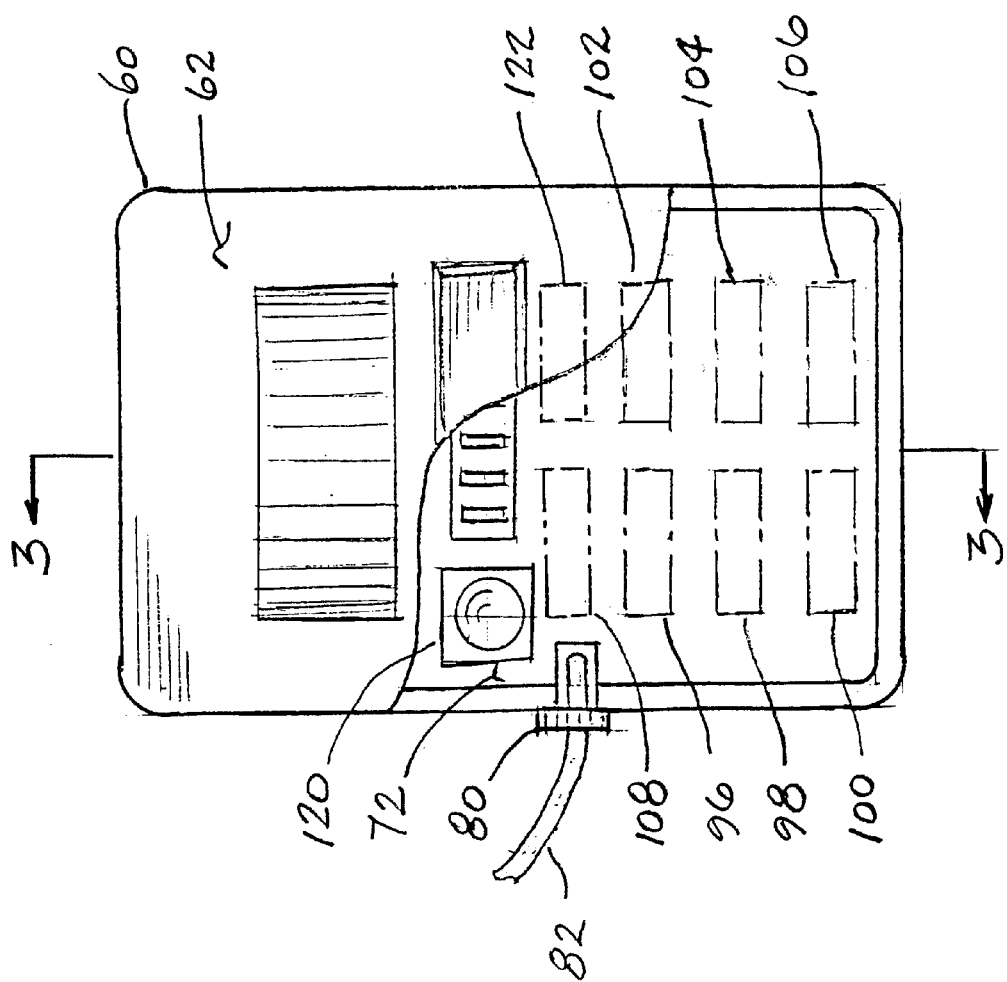
FIG. 2 is a front elevation view of the self-contained monitor of the present invention.

FIGS. 2 and 3 illustrate the improved self-contained monitor 60 which includes a housing 62 having a front section 64, pictured partially fragmented, and a rear section 66 each molded from plastic resin and shaped to accommodate the components of the self-contained monitor 60. A printed circuit board (PCB) 72 mounts certain of the electrical components thereon and a primary power source 76 comprising a battery pack 78 and/or a power jack 80 for an AC adaptor cord 82, a short length of which is shown in FIG. 3, electrically couples a DC potential to the electrical components. The AC adaptor cord 82 is connected to a well known AC wall outlet adaptor (not shown) which transforms and rectifies AC line voltage to the DC potential. As will be explained in more detail below, it has been found that because of the power consumed by the electrical components comprising the self-contained monitor 60, it is advantageous to use only the AC wall outlet adaptor as the primary power source providing energy to the components.

In addition, there is shown in FIGS. 2 and 3 a known Passive Infrared (PIR) detector 86 or an equivalent motion sensing device mounted on the PCB 72 adjacent an arcuate fresnel lens 88 affixed to the front section 64 which communicates with a responder 104. The fresnel lens 88 is well known in the art as a means by which to focus infrared energy on the PIR detector 86 in order to sense an intruder entering the detection pattern 38 of the self-contained monitor 60 which is aimed to surveil the predetermined space 10 as shown in FIG. 1. The sensing of the intruder by the PIR detector 86 prompts the responder 104 to sound an alarm in order to frighten away the intruder.

Also mounted on the PCB 72, electrically coupled to the PIR detector 86 and the primary power source 76, are an RF receiver circuit 96, a volatile memory circuit 98, a nonvolatile memory circuit 100, and a logic circuit 102. For the sake of clarity, certain of the aforementioned components are shown diagrammatically in FIG. 2 as defining areas on the PCB 72 bounded by dashed lines pictured thereon. As previously mentioned, the RF receiver circuit 96 is the type commonly used with garage door openers and is employed in the self-contained monitor 60 to receive the particular RF carrier signal transmitted by the remote controller 20 (FIG. 1). By manipulating the remote controller 20, the user selectively transmits different coded RF carrier signals such as either a coded RF arm signal or a coded RF test signal. The volatile memory circuit 98 has an armed state and a disarmed state employed to provide the user with a means by which to remotely test for the occurrence of at least one intrusion.

While leaving the predetermined space 10 (FIG.1), the user arms the monitor 60 by transmitting the coded RF arm signal. Should an intruder enter the predetermined space during the user's absence, the monitor 60 senses the intrusion and switches the volatile memory circuit 98 from the armed state to the disarmed state thereby activating the responder 104. The sounding of the alarm may prompt a startled intruder to try to mute the responder 104. When the alarm is triggered, the intruder most probably will be able to determine the location of the self-contained monitor 60 and disconnect its power source to silence the alarm. Therefore, it is advantageous to alternatively switch the volatile memory circuit 98 from the armed state to the disarmed state as a result of at least one sustained primary power interruption, as would occur if the intruder disconnects the self-contained monitor 60 from its primary power source 76, recording the same as having been caused by the intruder. Upon returning, the user manipulates the remote controller 20 (FIG. 1) causing it to transmit the coded RF test signal in order to remotely test the state of the volatile memory circuit 98. If the self-contained monitor 60 produces a response, the returning occupant can be reasonably assured that an intrusion has not occurred. If the self-contained monitor 60 does not respond, the returning occupant can be reasonably suspect that an intrusion has occurred and it may not be safe to enter the premises 18 (FIG. 1).

As will be explained in more detail below, the self-contained monitor 60 is made responsive to the remote controller 20 (FIG. 1) via a tuning code installed by the authorized user in the nonvolatile memory circuit 100 which tunes the receiver circuit 96 to the particular RF carrier signal transmitted by the remote controller 20. Further, as presented in this disclosure and as is generally accepted in the art, a volatile memory is defined as a device which loses the data stored therein when the primary power source energizing the device is interrupted and, conversely, a nonvolatile memory arrangement does not. For example, the data stored in the volatile memory circuit 98 is lost when the AC adaptor cord 82 is unplugged and, if the self-contained monitor 60 includes the battery pack 78, when the batteries in the battery pack 78 are removed. It is important to note that reconnecting primary power to the self-contained monitor 60 does not restore the volatile memory circuit 98 of the present invention to the armed state. If such were the case, the intruder could simply interrupt and restore power to the self-contained monitor 60 in order to rearm the volatile memory circuit 98, avoid the detection pattern 38 (FIG. 1) of the rearmed self-contained monitor 60, and remain in the premises 18 (FIG. 1) to accost an unsuspecting returning occupant. In the present invention, after the volatile memory circuit 98 is disarmed by either the sensing of the intrusion or the aforementioned sustained power interruption, it can only be restored to the armed state by a coded arm signal, such as the coded RF arm signal described above, which matches and is qualified by the tuning code installed by the authorized user in the nonvolatile memory 100. Since the data stored in the nonvolatile memory circuit 100 is not erased when primary power is interrupted, it is advantageous to store the tuning code therein so that the user does not have to reprogram the system after each time primary power is removed therefrom.

Various types of nonvolatile memory circuit arrangements are known in the industry which, once programmed, do not lose the data stored therein unless reprogrammed by the user. Commercially available long term energy storage capacitors are designed to hold an electrical charge for at least several months and are adapted specifically to provide a back-up voltage for a solid state memory making it nonvolatile by providing an uninterrupted voltage thereto should the primary power be interrupted for a sustained period of time. In their idle state, backup capacitors are kept charged by the primary power. In FIGS. 2 and 3 there is shown a backup capacitor 106 which is electrically coupled to the nonvolatile memory circuit 100 and which may be obtained as a model SG capacitor from Panasonic.

As previously noted, it has been found that when the self-contained monitor 60 is employed to surveil the predetermined space 10 (FIG. 1) and report the occurrence of an intrusion therein, it is advantageous and less costly to supply primary power thereto through the AC adaptor cord 82 rather than via batteries. If the self-contained monitor 60 is powered by batteries, because of the electrical energy consumed performing the aforementioned testing and reporting functions during an extended period of time, the batteries have to be replaced too frequently. Further, the components of the self-contained monitor 60 can be contained in a much smaller and indistinguishable package if the housing 62 does not include space for the battery pack 78.

However, when AC power is used as the only primary power source energizing the self-contained monitor 60 and backup batteries are not employed, the self-contained monitor 60 is subject to the momentary and sustained power interruptions associated with AC power lines feeding electrical energy to premises located in apartment buildings, housing developments, commercial buildings and the like. On such AC lines, momentary power interruptions that can affect electronic equipment connected to the line occur quite frequently and are generally caused by environmental conditions such as lightning, high winds and heavy rains and are sometimes of sufficient duration to cause illuminated electric light bulbs to flicker, a phenomenon with which we are familiar. In addition, utility company maintenance of the power grid and local electrical repair work in apartment and commercial buildings also create momentary interruptions. Those skilled in the art recognize AC interruptions which are of short duration as "sags" and "undervoltages". Such interruptions may or may not be visibly detected but are easily sensed by electronic devices such as the volatile memory circuit 100. Industry studies show that utility company customers can expect a substantial number of such faults per year occurring on their AC power lines. Sustained interruptions are typically the result of hurricanes, blizzards, ice storms and utility company major power failures and occur far less frequently than momentary interruptions. Such occurrences are usually publicized and would be known to a returning occupant. Given that one of the objectives of the present invention is to warn the returning occupant that there exists the possibility of an intruder remaining in his or her premises, it is safe for the user to assume that a sustained power interruption recorded by the self-contained monitor 60 was most probably caused as the result of an intrusion.

To optimize the reporting reliability of the self-contained monitor 60, it is important that momentary power interruptions on the AC power line of say less than a second or two do not cause the volatile memory circuit 98 to switch from the armed to the disarmed state thereby causing the self-contained monitor 60 to respond as if an intrusion had occurred. In FIGS. 2 and 3 there is shown a short term energy storage circuit 108 electrically coupled to the volatile memory circuit 98 supplying secondary power thereto, which in the preferred embodiment, may be a standard capacitor or equivalent thereof available from any one of a number of sources such as Cornell Dubilier. If a momentary power interruption occurs on the AC line, the short term energy storage circuit 108 is a temporary source of electrical energy which prevents the volatile memory circuit 98 from sensing a loss of power and switching from the armed to the disarmed state as a result of the momentary power failure.

In the prior art, there are intrusion detection systems energized by AC power backed up by batteries. It is generally the purpose of the backup batteries to ensure continued surveillance for intrusions during AC power failures. Such systems do not differentiate between momentary and sustained AC power interruptions and the battery backup supplies power to the system during both momentary and sustained interruptions. Unlike the prior art, the self-contained monitor 60 does not react to all power interruptions thereto, rather it records and may be remotely tested for only those that last more than a preset period of time. Those skilled in the art recognize that the capacitance value of the short term energy storage circuit 108 can be selected to coordinate with the combined capacitance of the electrical components in the self-contained monitor 60 to produce the aforementioned preset period of time of up to several seconds. The short term energy storage circuit 108 may also include a standard resistor having an ohmic value selected to facilitate coordinating the electrical characteristics of the short term energy storage circuit 108 with the combined impedance of the other electrical components comprising the self-contained monitor 60. Further, the short term energy storage circuit 108 may be employed in the self-contained monitor 60 wherein the use of a backup battery is made optional so that when the user elects to employ only AC power, the system does not record momentary AC power interruptions. By not recording momentary power interruptions that occur on the AC power line as possibly the result of an intrusion, the system of the present invention minimizes the number of times a returning occupant may needlessly seek help based on the lack of a monitor response to the RF test signal.

Figure 4:
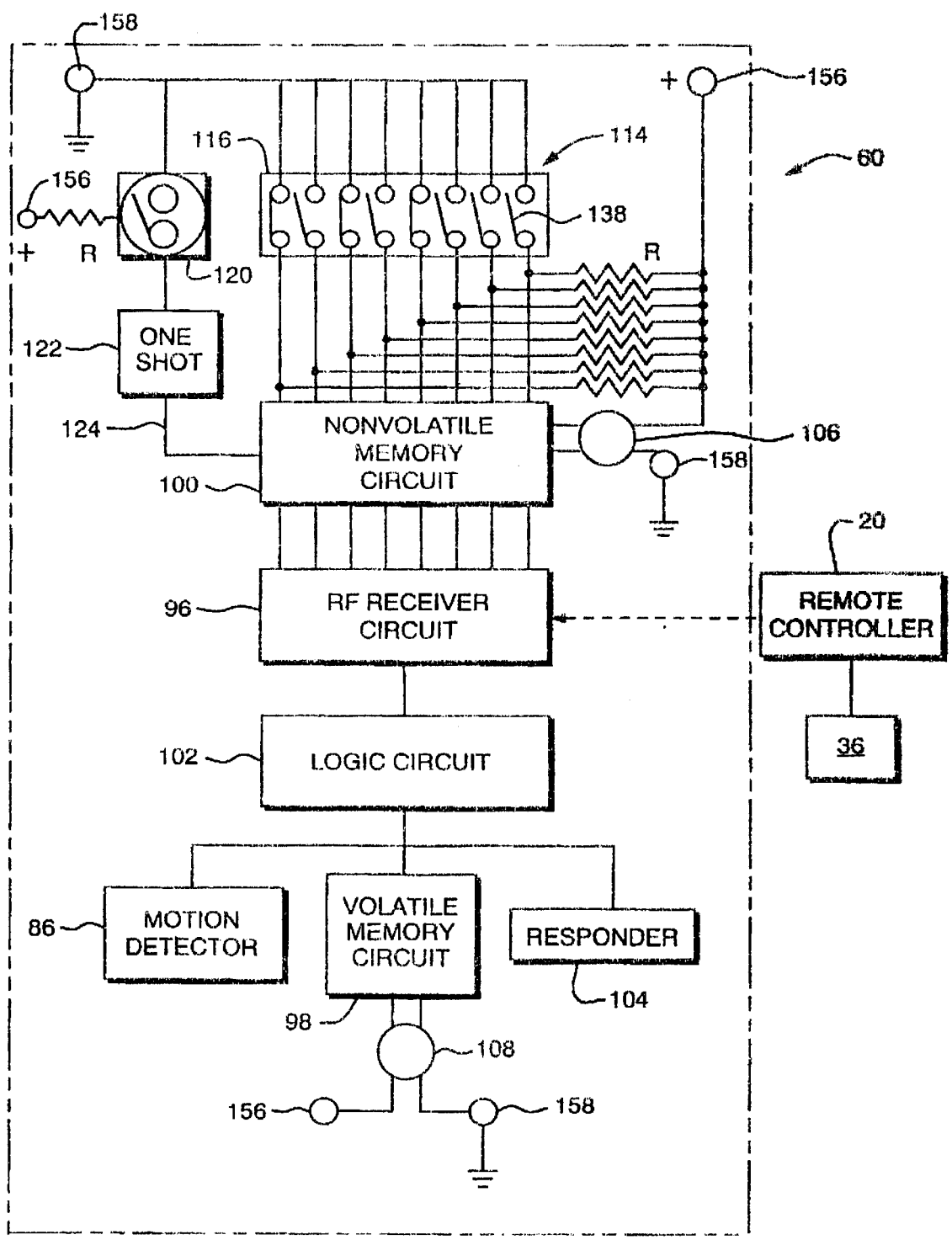
FIG. 4 is a block diagram of the intrusion detection system of the present invention.

FIG. 4 is a block diagram illustrating the manner in which certain of the components pictured in FIGS. 2 and 3 are electrically coupled to a positive terminal 156 and a ground terminal 158 of the primary power source 76. In the preferred embodiment, a digital switch 116 comprises eight individual on-off switches 138. Each individual switch 138 may be set manually in either the on or closed position, representing the binary number zero, or the off or open position representing the binary number one. When the user activates a code transfer switch 120, a one shot 122 in a code transfer circuit 124 causes the binary code set on the digital switch 116 to be transferred into the nonvolatile memory circuit 100 thereby making the receiver circuit 96 responsive to the particular RF carrier signal represented by this binary tuning code. In the instant invention, the RF receiver circuit 96 may also be tuned to the particular RF carrier signal by anyone of the previously mentioned known methods for storing a unique tuning code in the nonvolatile memory circuit 100 to prevent interference with other RF systems in the vicinity and the use of an unauthorized remote controller.

The logic circuit 102 is electrically coupled to the RF receiver circuit 96, the motion detector 86, the volatile memory circuit 98 and the responder 104. It monitors the status of the elements to which it is electrically coupled and directs them to respond according to particular system conditions. For example, upon receipt of the RF arm signal to which the RF receiver circuit 96 is tuned, if the volatile memory circuit 98 is not armed, the logic circuit 102 will arm it. Further, if the motion detector 86 senses an intruder and if the volatile memory circuit 98 is armed, the logic circuit 102 will disarm it. In addition, if the volatile memory circuit 98 senses a loss of power and if the same is armed, the logic circuit 102 will disarm it. As a final example, if the RF receiver circuit 96 receives the RF test signal to which it is tuned and if the volatile memory circuit 98 is armed, the logic circuit 102 will direct the responder 104 to generate an audible or a visible response indicating that an intrusion has not occurred and it is safe to enter the surveilled space. The capacitor backup 106 is electrically coupled to the nonvolatile memory circuit 100 and the positive terminal 156 and the ground terminal 158 through which the nonvolatile memory circuit 100 receives primary power. The capacitor backup 106 provides a voltage to the nonvolatile memory circuit 100 during a sustained power interruption such that the tuning code stored therein is not erased as a result thereof.

Also, shown in FIG. 4 is the short term energy storage circuit 108 connected across the positive terminal 156 and the ground terminal 158 through which the volatile memory circuit 98 receives primary power. The short term energy storage circuit 108, or the electrical equivalent thereof, provides a voltage to the volatile memory circuit 98 during momentary interruptions of primary power. Thus, the volatile memory circuit 98 is not switched from the armed to the disarmed state as a result thereof thereby eliminating the possibility of the self-contained monitor 60 producing an erroneous intrusion report because of momentary interruptions.

The present invention minimizes false intrusion reports which are a significant problem and inconvenience for a returning occupant who would otherwise needlessly seek help based on an erroneous remote test because a momentary power failure on the AC line switched the volatile memory circuit 98 to the disarmed state. Sustained power interruptions are more likely to be caused by an intruder and, as previously noted, cause the volatile memory circuit 98 to be switched to the disarmed state.

It is to be understood that the present invention is not limited to the precise details of structure shown and set forth in this specification, for obvious modifications will occur to those skilled in the art to which the invention pertains.

What is claimed is:

1. In an improved intrusion detection system including a self-contained monitor having a motion sensor surveiling a predetermined space detecting an occurrence of an intrusion in said space, a primary power source energizing said self-contained monitor including a volatile memory circuit having an armed state and a disarmed state communicating with a nonvolatile memory circuit having a tuning code stored therein, said volatile memory circuit being switched from said disarmed state to said armed state by an arming signal being qualified by said tuning code and being switched from said armed state to said disarmed state by a sensing of an interruption of primary power thereto, the improvement comprising:

said volatile memory circuit sensing only said interruption of primary power having a duration longer than a preset period of time; and a short term energy storage circuit communicating with said primary power source and said volatile memory circuit supplying secondary power thereto such that said volatile memory circuit does not sense said interruption of primary power during said preset period of time.

2. An intrusion detection system in accordance with claim 1 wherein said primary power source further comprises an AC power line voltage rectified to a DC voltage.

3. An intrusion detection system in accordance with claim 1 wherein said preset period of time is less than about two seconds.

4. An intrusion detection system in accordance with claim 1 wherein said motion sensor, upon detecting said occurrence of said intrusion in said predetermined space, causes said volatile memory circuit to switch from said armed to said disarmed state.

5. An intrusion detection system in accordance with claim 1 further comprising a responder communicating with said volatile memory circuit for reporting said state thereof, said responder being responsive to a remote controller manipulated by a user prompting said responder to generate a response if said volatile memory circuit is in said armed state.

6. An intrusion detection system in accordance with claim 5 wherein said responder communicates with said nonvolatile memory circuit, said tuning code stored therein making said responder responsive to said remote controller.

7. An improved self-contained monitor for recording an occurrence of an intrusion in a premises comprising:

a volatile memory circuit having an armed state and a disarmed state being energized by an AC power line supplying an AC voltage to said premises;

said AC power line having momentary and sustained power interruptions associated therewith;

said volatile memory circuit being switched from said armed state to said disarmed state by sensing a power interruption thereto; and a short term energy storage circuit supplying power to said volatile memory circuit during said momentary power interruptions such that said volatile memory circuit does not sense said momentary power interruptions.

8. An improved self-contained monitor in accordance with claim 7 wherein said AC power line energizes said volatile memory circuit via an AC wall outlet adaptor which transforms and rectifies said AC voltage to a DC voltage coupled to said volatile memory circuit.

9. An improved self-contained monitor in accordance with claim 7 wherein said momentary power interruptions have a duration of less than about two seconds.

10. An improved self-contained monitor in accordance with claim 7 further comprising a motion sensor for detecting said occurrence of said intrusion in said premises causing said volatile memory circuit to switch from said armed to said disarmed state.

11. An improved self-contained monitor in accordance with claim 7 further comprising a responder communicating with said volatile memory circuit for reporting said state thereof, said responder being responsive to a remote controller manipulated by a user prompting said responder to generate a response if said volatile memory circuit is in said armed state.

12. An improved self-contained monitor in accordance with claim 7 wherein said volatile memory circuit is switched from said disarmed state to said armed state by a coded arm signal.

13. A method for detecting and reporting an occurrence of an intrusion in a predetermined space including the steps of:

a) providing a self-contained monitor having a volatile memory circuit defining an armed and a disarmed state energized by a primary power source voltage for surveilling said predetermined space: and having a short-term energy storage circuit powering said monitor during momentary interruptions of said primary power source voltage;

b) monitoring said primary power source for voltage interruptions;

c) sensing a sustained voltage interruption having a duration longer than a predetermined period of time; and d) switching said volatile memory circuit from said armed state to said disarmed state as a result of said sustained voltage interruption.

14. The method set forth in claim 13, including the additional step of providing a responder for reporting said state of said volatile memory circuit.

15. The method set forth in claim 14, including the additional step of providing a remote controller for communicating with said responder.

16. The method set forth in claim 15, including the additional step of manipulating said remote controller prompting a response from said responder if said volatile memory circuit is in said armed state.

17. The method set forth in claim 13 including the additional step of switching said volatile memory circuit from said disarmed state to said armed state by a coded arm signal from said remote controller.

* * * * *